United States Patent
Wang et al.

(10) Patent No.: US 8,514,837 B2
(45) Date of Patent: Aug. 20, 2013

(54) METHOD OF COMMUNICATING DATA IN COMMUNICATION SYSTEMS

(75) Inventors: Xiangyu Wang, Eindhoven (NL); Yonggang Du, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1283 days.

(21) Appl. No.: 12/304,126

(22) PCT Filed: Jun. 12, 2007

(86) PCT No.: PCT/IB2007/052209
§ 371 (c)(1),
(2), (4) Date: Dec. 10, 2008

(87) PCT Pub. No.: WO2007/144822
PCT Pub. Date: Dec. 21, 2007

(65) Prior Publication Data
US 2009/0175260 A1    Jul. 9, 2009

(30) Foreign Application Priority Data
Jun. 14, 2006    (EP) .................................... 06115447

(51) Int. Cl.
*H04J 3/06*    (2006.01)
(52) U.S. Cl.
USPC ............ 370/350; 370/328; 455/443; 455/503
(58) Field of Classification Search
None
See application file for complete search history.

(56) References Cited

U.S. PATENT DOCUMENTS

| | | | |
|---|---|---|---|
| 2004/0264403 A1* | 12/2004 | Fette et al. | 370/328 |
| 2005/0157681 A1 | 7/2005 | Tajima | |
| 2005/0201407 A1* | 9/2005 | Kim et al. | 370/432 |
| 2006/0007881 A1 | 1/2006 | Kondo | |
| 2006/0194616 A1 | 8/2006 | Willins et al. | |
| 2007/0167181 A1* | 7/2007 | Ramesh et al. | 455/502 |
| 2007/0207836 A1* | 9/2007 | Gormley et al. | 455/561 |
| 2008/0205322 A1* | 8/2008 | Cai et al. | 370/312 |

* cited by examiner

*Primary Examiner* — Chi Pham
*Assistant Examiner* — Mohammad Adhami

(57) ABSTRACT

There is elucidated a method of communicating data packets (210; 520) within a data communication network (10). The network (10) comprises communication nodes (30a, 30b, 30c, 40), wherein a first nodal set (30a, 30b, 30c) comprises nodes which are operable to communicate via a communication medium with a second nodal set (40) comprising at least one of said nodes (30a, 30b, 30c, 40). The method comprises steps of: (a) mutually synchronizing together two or more nodes of said first nodal set; and (b) simultaneously in a synchronized manner transmitting one or more data packets from the mutually synchronized two or more nodes of said first nodal set via said communication medium for substantially simultaneous reception at said second nodal set (40). The network (10) is susceptible to being simpler to implement in comparison to comparable contemporary communication networks, as well as potentially providing a better quality-of-service (QoS) especially when handover from one access point node to another is considered.

10 Claims, 3 Drawing Sheets

METHOD OF COMMUNICATING DATA IN COMMUNICATION SYSTEMS

The present invention relates to methods of communicating data in communication systems, for example to methods of communicating in wireless systems each including multiple access point nodes (APs) operable to communicate data to and receive data from stationary nodes (STA). Moreover, the present invention also relates to communication systems utilizing such methods, for example wireless communication systems utilizing such methods. Furthermore, the present invention also concerns access point nodes (APs) for communications systems, and also mobile stations for such systems. Additionally, the present invention concerns software products executable on computing hardware for implementing the aforesaid methods.

In communication systems each comprising a plurality of mutually spatially distributed nodes coupled together via communication paths established in a medium, for example wireless local area networks (WLANs) including mutually spatially distributed nodes coupled via wireless links, data communication within the systems is rendered more complicated when their communication paths are operable to convolve data communicated therethrough in a complex manner. For example, wireless links used in WLANs are susceptible to exhibiting fading and multipath reflections, especially when relative positions between nodes is susceptible to temporally changing. Problems arise when communication between needs nodes to be performed in a synchronized manner in such communication systems.

In a published United States patent application no. US2005/0169209, there is described a communication system operable to implement multi-access transmission of data using a plurality of access point nodes. The system is operable to implement a method of identifying a plurality of access point nodes to be used mutually in cooperation for transmitting data to a receiver node. The method concerns transmission of data to the receiver node via the plurality of access point nodes, wherein the data is transmitted in a pattern that uses at least two access point nodes during at least some portion of a transmission period.

Contemporary WLANs often conform to an internationally agreed standard IEEE 802.11. The standard specifies a relatively simple architecture in which a mobile station receiver node (STA) is always associated with solely one access point node (AP) at any given instance when communicating in an infrastructure mode. Utilization of such a simple architecture has rendered WLAN products conforming to the standard fast and cheap to develop commercially.

In implementing robust WLAN systems, users have become accustomed to and/or require a high quality of service (QoS), namely a low bit error rate, and reliability of communication, namely no down time. Such quality of service (QoS) is difficult to ensure when the aforesaid mobile station receiver node (STA) is spatially moving relative to access point nodes (APs) such that handover from one access point node to another access point node is susceptible to causing data packet loss and jitter.

Earlier attempts to address quality of service (QoS) issues have exploited inherent diversity in WLANs and similar types of networks. Diversity arises from a situation when the mobile station node (STA) is transmitting data packets; potentially, several access point node (APs) are potentially operable to receive such data packets. The several access point nodes (APs) are capable of executing cooperative processing of the data packets received thereat from the mobile station node (STA). The cooperative processing includes, for example, sending acknowledgements to the mobile station node (STA) confirming receipt of data packets transmitted from the mobile station node (STA) and eliminating reception at the several access point nodes (APs) of duplicate data packets. When several access point nodes (APs) are providing support to mobile station node (STA), the station node (STA) is always coupled in communication with the access point nodes (APs) when at least of the access point nodes (APs) can receive data packets transmitted from the station node (STA).

Proposals for designs of protocol concerning mutually cooperating access point nodes (APs) for uplink data transmission in WLANs are known. These designs are capable of providing interference mitigation; the mitigation is provided, for example, by way of at least two access point nodes (AP) amongst several access point nodes (APs) functioning in cooperation and being operable to receive an uplink data packet correctly, namely substantially without errors. However, in order to ensure reliable data communication to the mobile station node (STA) for example, it is desirable that only one access point node (AP) sends a corresponding acknowledgement data packet (ACK) to the mobile station node (STA) is response to receiving a preceding transmitted data packet from the mobile station node (STA). The aforesaid designs of protocol therefore require arbitration between mutually cooperating access point nodes (APs). Such arbitration can be achieved, for example, by assigning the several access point nodes (APs) so as to be a primary access point node (AP-Prim), and secondary access point nodes (AP-Sec) and by using temporally slotted transmission of acknowledgement data packets (ACK).

However, such designs of architecture have limitations in that implementing cooperative reception of data packets from one or more mobile station nodes (STAs) exploiting Ethernet to provide a backbone to the access point nodes (APs) is limited to configurations only comprising repeaters, for example Ethernet hubs; such Ethernet hubs are contemporarily regarded as being obsolete. In operation, there are only a limited number of acknowledgement data packs (ACKs) accommodated in contemporary standards, for example for WLANs; in practice, contemporary implementations of WLANs provide only limited time before, for example, the mobile station node (STA) stops waiting to receive an acknowledgement data packet (ACK).

Thus, a technical problem addressed by the present invention is to enable timely response for mutually cooperating access point nodes (APs) to a mobile station node (STA) in response to receiving one or more data packets transmitted therefrom.

An object of the present invention is to provide a data communication system including multiple access point nodes operable to communicate with one or more mobile station nodes which is capable of providing enhanced quality-of-service (QoS).

According to a first aspect of the present invention, there is provided a method of communicating one or more data packets within a data communication network, the network comprising a plurality of communication nodes, wherein a first nodal set comprises of a plurality of the nodes which are operable to communicate via a communication medium with a second nodal set comprising at least one of said nodes, wherein the method comprises steps of:

(a) mutually synchronizing together two or more nodes of the first nodal set; and (b) simultaneously in a synchronized manner transmitting one or more data packets from the mutually synchronized two or more nodes of the first nodal set via said communication medium for substantially simultaneous reception at the second nodal set.

The invention is of advantage in that synchronized transmission of data packets from the multiple access point nodes is capable of providing an enhanced quality-of-service (QoS) within the network.

Optionally, in the method, the first nodal set comprises a plurality of access point nodes which are mutually couplable in communication via a backbone for implementing synchronization therebetween, and the second nodal set comprises a mobile station node whose spatial position relative to the first nodal set is susceptible to temporally change, and wherein the communication medium includes wireless communication. Such implementation is of advantage in that the network is more capable of providing reliable communication to the mobile station node as it passes out of range of certain access point nodes and into the range of other access point nodes.

Optionally, in the method, the mutual synchronization of the two or more nodes of the first nodal set includes steps of:
(c) synchronizing the two or more nodes of the first nodal set to at least one data packet received from the second nodal set, to determine a reference frequency parameter and/or a timing parameter; and
(d) maintaining operation of the two or more nodes of the first nodal set pursuant to the reference frequency parameter and/or the timing parameter so that subsequent transmission in step (b) of the one or more data packets to the second nodal set is mutually synchronized.

Such synchronization to earlier received data packets and maintenance of synchronization conditions to subsequent simultaneous transmission of data packets from multiple access point nodes to the mobile station node is susceptible to simplify operation of the network whilst also potentially providing a better quality of service (QoS). More optionally, in the method, the synchronization in step (c) is assisted by way of a preamble included in data packets communicated to the first nodal set.

Optionally, in the method, the synchronization in step (c) is maintained until transmission of the one or more data packets to the second nodal set by utilizing a hold-over mode in phase-locked-loops of the first nodal set implemented pursuant to the standards IEEE 802.11 and variants thereof. Extending an existing feature of the standard to provide a new function is of benefit in that it is capable of simplifying implementation of the method without increase cost and/or complexity of the network significantly.

Optionally, in the method, the plurality of nodes of first nodal set are mutually coupled together by way of a communication backbone supporting data communication therebetween. More optionally, the backbone is implemented using wired Ethernet.

Optionally, in the method, the data communication network is implemented as a wireless local area network (WLAN).

Optionally, in the method, data packets communicated in the network includes at least one of: clear-to-send (CTS), request-to-send (RTS), acknowledgement (ACK), data packets (DATA) conveying data bundles.

According to a second aspect of the invention, there is provided a data communication network comprising a plurality of communication nodes, wherein a first nodal set comprises of a plurality of the nodes which are operable to communication via a communication medium with a second nodal set comprising at least one of the nodes, wherein:
(a) two or more nodes of the first nodal set are operable to be mutually synchronized together; and
(b) two or more nodes of the first nodal set are operable simultaneously in a mutually synchronized manner to transmit one or more data packets from the mutually synchronized via a communication medium for substantially simultaneous reception at the second nodal set.

According to a third aspect of the invention, there is provided an access point node operable to function pursuant to the method according to the first aspect of the invention.

According to a fourth aspect of the invention, there is provided a mobile station node operable to function pursuant to the method according to the first aspect of the invention.

According to a fifth aspect of the invention, there is provided a software product executable on computing hardware for implementing a method according to the first aspect of the invention.

It will be appreciated that features of the invention are susceptible to being combined in any combination without departing from the scope of the invention as defined by the accompany claims.

Embodiments of the present invention will now be described, by way of example only, with reference to the accompanying drawings wherein:

FIG. 1 is an illustration of an embodiment of the present invention, the embodiment concerning a data communication network operable pursuant to an IEEE 802.11 standard and comprising a plurality of access point nodes (APs) mutually coupled together via an Ethernet backbone, the access point nodes (APs) being operable to communicate with a mobile station node (STA) via wireless local area network (WLAN) communication;

Figure 1:
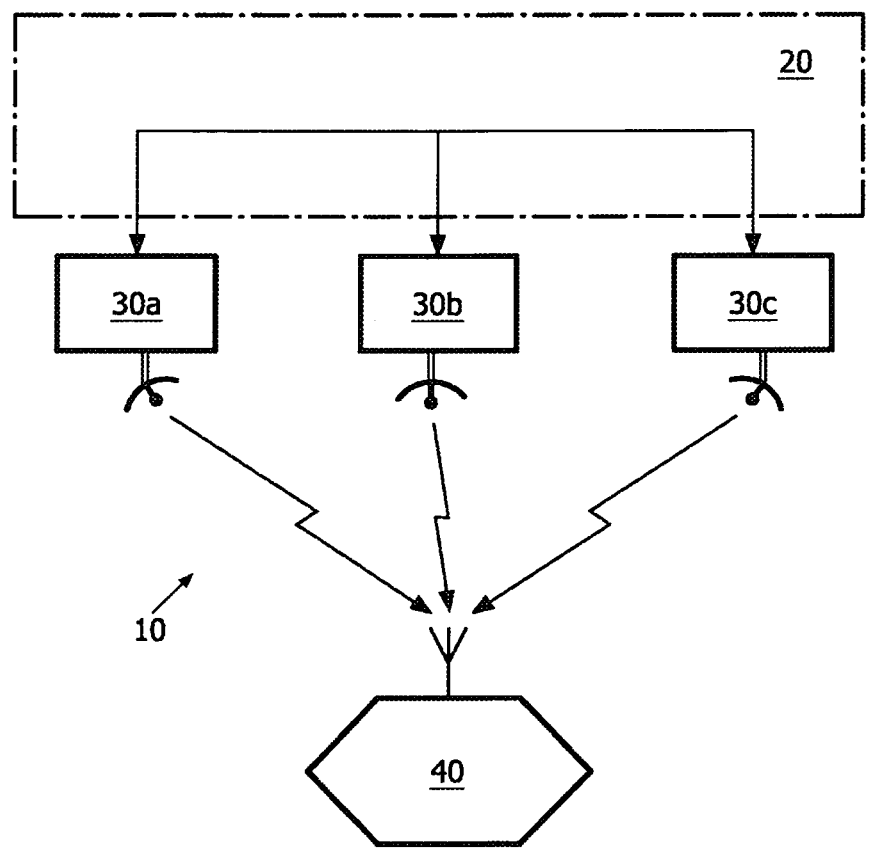
Figure 4:
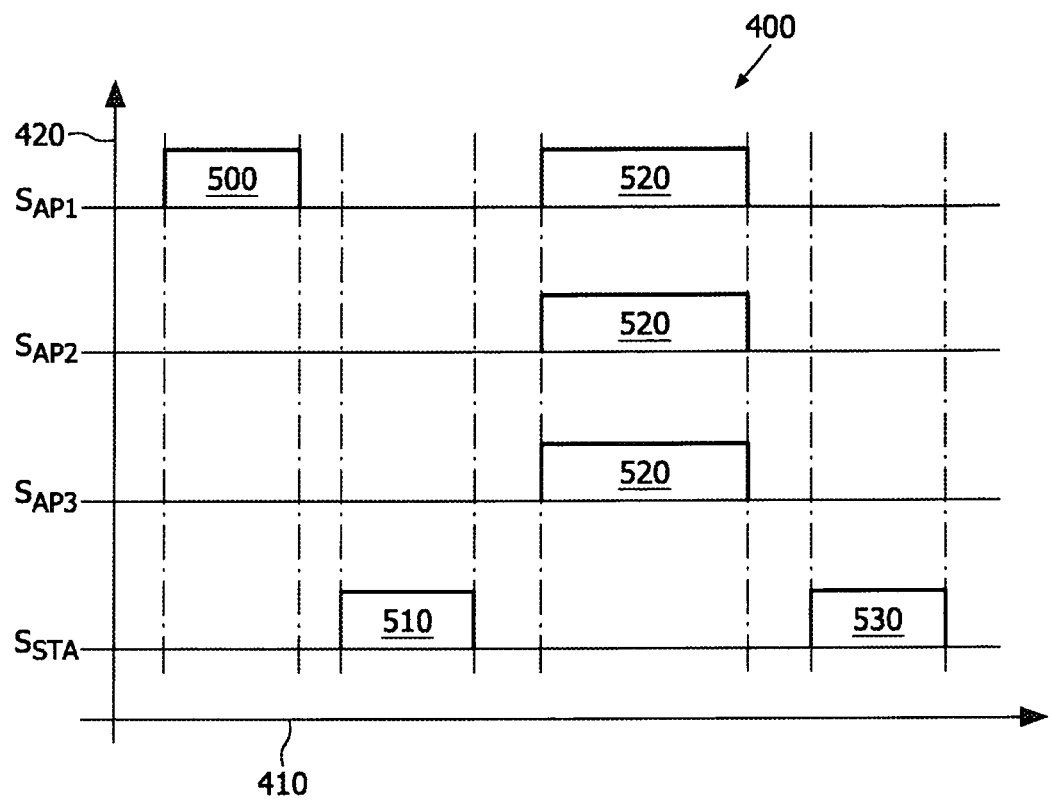
Figure 5:
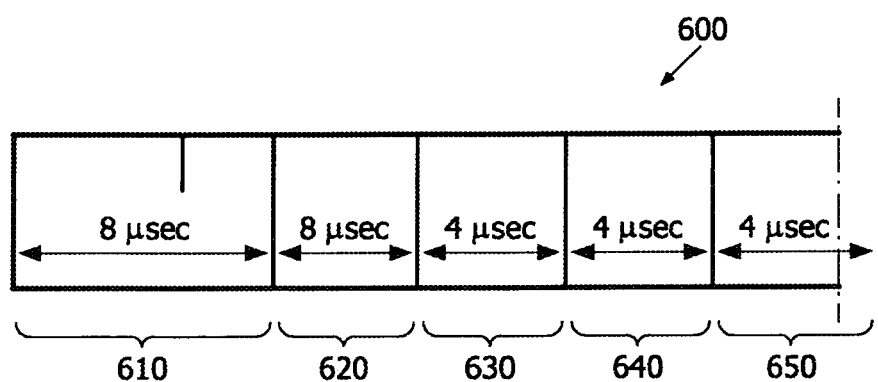

FIG. 4 is a graph pertaining to the network of FIG. 1 illustrating communication from one or more of the access point nodes (APs) to the mobile station node (STA) with subsequent acknowledgement therefrom: and FIG. 5 is a depiction of a preamble of data packets communicated within the communication system of FIG. 1, the preamble including data structures for assisting synchronization of phase-locked-loop oscillators employed within the network for ensuring synchronization of data communicated in operation within the network when multiple access point nodes simultaneously service the mobile station node (STA).

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

In overview, the present invention is concerned with methods, and also systems executing such methods, which are operable to enable timely response from mutually cooperating access point nodes (APs) to a mobile station node (STA) in response to receiving a data packet therefrom. The methods involve allowing multiple mutually cooperating access point nodes (APs) to transmit a response data packet simultaneously to the mobile station node (STA) wherein the response data packet, namely downlink data packet, has identical content for each of the cooperating access point nodes (APs). The methods circumvent a need to provide arbitration between the mutually cooperating access point nodes (APs).

Moreover, simultaneous transmission of mutually identical downlink data packets from mutually cooperating access point nodes (APs) to mobile stations nodes (STAs) is potentially capable of enhancing communication system robustness by providing increased diversity. On account of the access point nodes (APs) being mutually spatially distributed, in other words at mutually different spatial locations, fading of transmission from access point nodes (APs) to the mobile station node (STA) becomes independent; moreover, in a similar manner, propagation path loss and shadowing also become independent. Quality of service (QoS) is thereby improved for shadowing-intensive environments, for example indoor situations wherein complex radio reflections can occur. As an additional benefit from implementing the present invention, enhanced interference immunity is potentially achievable as signal energy received at the mobile station node (STA) derives from transmission from several access point nodes (APs) and thereby improves signal-to-noise ratio achievable.

In order to further elucidate the present invention, embodiments of the invention will now be described. The embodiments are described in a context of the aforesaid standard IEEE 802.11, although is not limited thereto. In embodiments described, an IEEE 802.11 wireless local area network (LAN) including access point nodes (APs) linked by way of an Ethernet backbone is considered. However, for example, the present invention is not limited to wireless networks and is susceptible to being utilized in networks wherein one or more access point nodes (APs) are mutually linked together via a wired backbone.

In a contemporary IEEE 802.11 data communication network, there is included at least one mobile station node (STA) and a plurality of access point nodes (APs) mutually spaced apart. The mobile station node (STA) is operable to associate with only one access point node (AP) at any given time as elucidated in the foregoing. In FIG. 1, there is shown the data communication network indicated generally by 10. The network 10 includes an Ethernet backbone 20 mutually coupling access point nodes 30a, 30b, 30c (AP1, AP2, AP3) together as illustrated. The mobile station (STA) is denoted by 40. In operation, at least one of the access point nodes 30a, 30b, 30c is operable to serve the mobile station node (STA) 40 by receiving data packets therefrom. After receiving a data packet emitted from the mobile station node (STA) 40, the network 10, in complying with the IEEE 802.11 standard, is operable to send a response data packet, for example an acknowledgement data packet (ACK), to the mobile station node (STA) 40. In order to maintain communication with the mobile station node (STA) 40 intact pursuant to the standard, only one such response data packet is permitted to be sent to the mobile station node (STA) 40.

When the network 10 is functioning in a conventional mode, fast arbitration between the access point nodes (AP1, AP2, AP3) 30a, 30b, 30c results in one of these nodes (AP1, AP2, AP3) 30a, 30b, 30c being selected to transmit the response packet to the mobile station node (STA) 40. However, the network 10 functioning pursuant to the present invention, more than one of the access point nodes (APs) 30a, 30b, 30c is operable simultaneously to send the response packet to the mobile station node (STA) 40. When such simultaneous transmission is employed, the response data packet can be at least one of: a control data packet, an acknowledgement data packet (ACK), a clear-to-send (CTS) data packet, and a data packet conveying data bundles.

Figure 2:
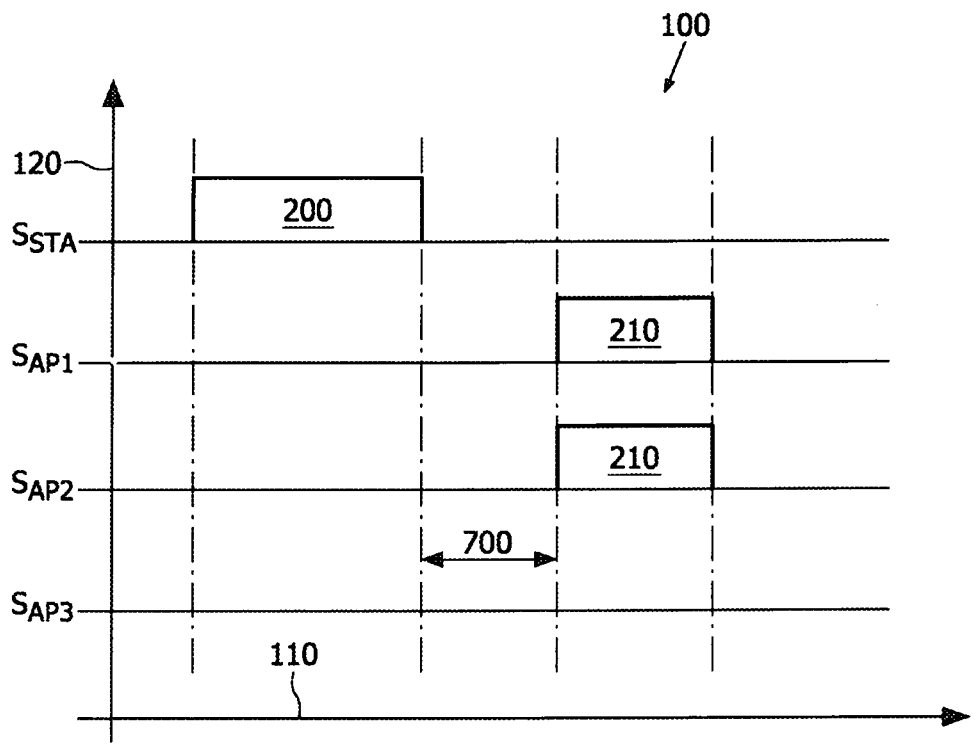
FIG. 2 is a graph pertaining to the network of FIG. 1 illustrating communication from the mobile station node (STA) to one or more of the access point nodes (APs) with subsequent acknowledgements therefrom.

Operation of the network 10 is also illustrated in FIG. 2 wherein a timing graph is indicated generally by 100. The graph 100 includes an abscissa time axis 110 representing passage of time from left to right. Moreover, the graph 100 includes an ordinate axis 120 denoting data of signals communicated in the network 10. A signal $S_{STA}$ is representative of data packets transmitted from the mobile station nodes (STA) 40 for receipt at one or more of the access point nodes 30a, 30b, 30c (AP1, AP2, AP3). Signals $S_{AP1}$, $S_{AP2}$, $S_{AP3}$ are representative of data packets transmitted from the access point nodes 30a, 30b, 30c (AP1, AP2, AP3) respectively. In the graph, the mobile station node (STA) 40 transmits a data packet 200 for receipt at one or more of the access point nodes 30a, 30b, 30c. On receipt of the data packet 200, the access point nodes 30a, 30b (AP1, AP2) simultaneously and in synchronism transmit an acknowledgement data packet 210 to the mobile station node (STA) 40.

In an event that the access point node 30c (AP3) does not receive the data packet 200 correctly, for example as identified by inconsistent matching of error checking parity bits to corresponding data, the access point node 30c (AP3) does not transmit its corresponding acknowledgement data packet as illustrated in FIG. 2. The mobile station node (STA) 40 is operable to assume successful and completed sending of data therefrom when at least one of the access point nodes 30a, 30b, 30c (AP1, AP2, AP3) has received the data packet 200. Pursuant to the present invention, it is not necessary in the network 10 that one and only one access point node 30a, 30b, 30c (AP1, AP2, AP3) is restricted to responding with the acknowledgement data packet 210. Fast arbitration between the access point nodes 30a, 30b, 30c (AP1, AP2, AP3) is thereby avoided in contradistinction to contemporary known methods; such avoidance of arbitration is a considerable benefit provided by the present invention, for example for reducing data traffic in the Ethernet backbone 20 and simplifying network 10 design and implementation.

Figure 3:
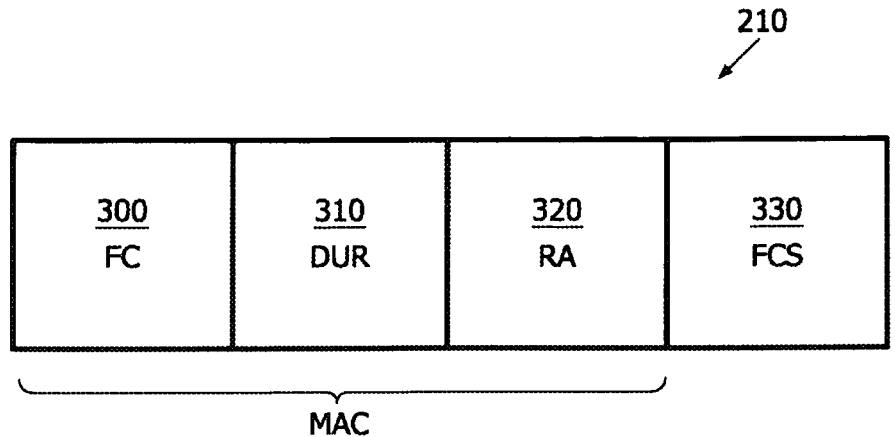
FIG. 3 is an illustration of component parts of acknowledgements depicted in FIG. 2.

The acknowledgement data packet 210 will be described in further detail with reference to FIG. 3. In FIG. 3, the acknowledgement data packet 210 is shown to comprise first, second, third and fourth sections denoted by 300, 310, 320, 330 respectively. The first section 300 includes 2 octets of data, the second section 310 includes 2 octets of data, the third section 320 includes 6 octets of data, and finally the fourth section 330 includes 4 octets of data. Moreover, the first, second and third sections 300, 310, 320 constitute a MAC header.

The first section 300 is concerned with frame control (FC), whereas the second section 310 is concerned with duration (DUR) of the data packet 210. The third section 320 is used to convey receiver address (RA), whereas the fourth section 330 is concerned with frame check sequence (FCS). The first section 300 corresponding to frame control (FC) has a length of 16 bits whose function is allocated as provided in Table 1:

TABLE 1

FCS section 300 bit allocation

| FCS section 300 bit | Function of bit |
| --- | --- |
| B0-B1/B2 | Protocol version |
| B1/B2-B3/B4 | Type |
| B3/B4-B7 | Sub-type |
| B8 | To DS |
| B9 | From DS |
| B10 | More frag |
| B11 | Retry |
| B12 | Power management (Pwr Mgt) |
| B13 | More data |
| B14 | WEP |
| Order | Order |

In operation, data for the second section (DUR) 310 and for the first section 300 (FCS) are calculated by individual access point nodes (APs) 30a, 30b, 30c, although the calculated data included in the first and second sections 300, 310 is identical for all acknowledgement data packets 210 communicated from the access point nodes 30a, 30b (AP1, AP2) communicated to the mobile station node 40. The third section (RA) 320 is copied from the data packet 200 and corresponds to an address allocated or otherwise associated with the mobile station node (STA) 40. In practice when implementing the present invention, most of data fields associated with the first section 300 (FCS) are set to a value "0", for example more fragments (More Frag), Retry, More data, WEP and Order; conversely, other fields of the first section 300 are simply copied from the data packet 200 transmitted from the mobile station node (STA) 40.

In the forgoing, simultaneous transmission of the acknowledgement data packet 210 to the mobile station node (STA) 40 is described. The network 10 is also operable to provide downlink data from a plurality of the access point nodes (APs) 30a, 30b, 30c to the mobile station node (STA) 40. Such simultaneous transmission of downlink data is depicted in FIG. 4 as a graph indicated generally by 400. The graph 400 includes an abscissa axis 410 depicting a passage of time from left to right. Moreover, the aforesaid signals $S_{AP1}$, $S_{AP2}$, $S_{AP3}$, $S_{STA}$ are shown along an ordinate axis 420. An example of communication between the mobile station node (STA) 40 and the access point nodes (AP1, AP2, AP3) 30a, 30b, 30c commences by the first access point node 30a (AP1) sending a request-to-send (RTS) data packet 500; alternatively, another of the access point nodes 30b, 30c (AP2, AP3) is operable to send the request-to-send (RTS) data packet 500. The request-to-send (RTS) data packet 500 is received at the mobile station node (STA) 40 which responds a short period thereafter by sending a clear-to-send (CTS) data packet 510. The clear-to-send (CTS) data packet 510 is received at one or more of the access point nodes 30a, 30b, 30c (AP1, AP2, AP3). All three access point nodes (AP1, AP2, AP3) 30a, 30b, 30c then simultaneously and synchronously send the downlink data as a downlink data packet 520 for receipt at the mobile station node (STA) 40. Upon successful receipt of the downlink data packet 520, the mobile station node (STA) 40 is operable to transmit an acknowledgement data packet 530 for subsequent receipt at one or more of the access nodes 30a, 30b, 30c (AP1, AP2, AP3).

In contradistinction to conventional contemporary downlink data packets, the downlink data packet 520 employs a relative more complex format which includes more data fields that are specific for each access point node 30a, 30b, 30c (AP1, AP2, AP3). However, in FIG. 4, the downlink data packets 520 transmitted from the access point nodes 30a, 30b, 30c (AP1, AP2, AP3) are mutually identical. Preferably, in generating the downlink data packet 520, one of the access point nodes 30a, 30b, 30c (AP1, AP2, AP3) is appointed or assumes a function as a primary access point node which then dictates to one or more of the other access point nodes which function as secondary, namely subsidiary, access point nodes.

In order to ensure simultaneous and synchronous transmission of data packets from one or more of the access point nodes 30a, 30b, 30c (AP1, AP2, AP3) to the mobile station node (STA), it is necessary that access point nodes (APs) 30a, 30b, 30c are mutually synchronized via the backplane 20. When implementing the present invention, time-reference and frequency-reference bases maintained in each of the access point nodes (APs) 30a, 30b, 30c have to be synchronized sufficiently such that sending times and frequency differences between the access point nodes (APs) 30a, 30b, 30c are small enough to allow for constructive addition of the data packets when received at the mobile station node (STA) 40 for enabling successful reception thereat. Synchronization between the access point nodes 30a, 30b, 30c (AP1, AP2, AP3) is a technical problem also addressed by the present invention.

In variants of the aforesaid IEEE 802.11 standard, namely in variants IEEE 802.11 g/a thereof, it is allowed to communicate PHY-type and MAC-type data packets; "PHY" and "MAC" have meanings as normally associated with the standard. Such PHY and MAC data packets include leading bits known as a "preamble". In FIG. 5, there is shown an OFDM training structure, namely a preamble, pursuant to the aforesaid standard IEEE 802.11 g/a. The preamble is indicated generally by 600 an includes from left to right a first portion 610 of substantially 8 μsec duration, a second portion 620 of 8 μsec duration, a third portion 630 of 4 μsec duration, a fifth portion 640 of 4 μsec duration, and a sixth portion of 4 μsec duration and so on. A first part of the first portion 610 is concerned with signal detection, automatic gain control (AGC) and diversity selection, whereas a second part of the first portion 610 is concerned with coarse frequency offset estimation and timing synchronization. The second portion 620 is concerned with channel and fine frequency offset estimation. Moreover, the third portion 630 is concerned with rate length. Finally, the fourth and fifth portions 640, 650 and portions (not shown) subsequent thereto are concerned with conveying actual data.

According to the standard, the preamble 600 is used by a receiver to lock into time and frequency synchronization of a transmitter such that demodulation and recovering of subsequent PHY or MAC data is facilitated. The IEEE 802.11 g/a standard also specifies for there to be 4 sub-carriers out of a total of 52 sub-carriers. The 4 sub-carriers are employed by the receiver to track time and frequency drift of the transmitter during a course of transmission of the aforesaid preamble and its associated subsequent data. When implemented, the receiver and the transmitter both include phase-locked-loops (PLL) circuits whose operation is controlled by the aforesaid preamble; pilot tones modulated onto the four carriers assist in such synchronization control.

Conventionally, when implementing the standard IEEE 802.11 g/a, time and frequency synchronization only need to be maintained for a duration of a data packet being sent and subsequently received. When transmission of the data packet is complete, synchronization between respective phase-locked-loops (PLLs) of the transmitter and receiver need not be maintained and the phase-lock-loops can then operate mutually in free running mode.

The present invention optionally is implemented by extending time and frequency synchronization as elucidated in the foregoing to providing synchronization amongst the access point nodes 30a, 30b, 30c (AP1, AP2, AP3). Such synchronization of the access point nodes (APs) 30a, 30b, 30c is possible by virtue of a hold-over mode provided in digital phase-lock-loops employed to conform to the aforesaid standard IEEE 802.11 g/a. In the hold-over mode, the phase-locked-loops (PLLs) are operable, when an input reference signal thereto fails, to maintain a last valid output frequency value prior to such failure; beneficially, multiple sample values of last valid output frequency are employed to obtain a more representative and less noise-affected value for last frequency.

As elucidated earlier, such synchronization of phase-locked-loops of the access point nodes (APs) 30a, 30b, 30c is important when implementing a communication protocol as depicted in FIG. 2. For example, multiple access point nodes (APs) 30a, 30b, 30c receiving the data packet 200 from the mobile station node (STA) 40 will all be synchronized to the mobile station node (STA) 40 by the preamble 600 of the data packet 200 for a duration of the data packet 200. However, in contradistinction to known data communication systems, synchronization is maintained in the network 10 beyond reception of the data packet 200 to include transmission of the subsequent acknowledgement data packets 210. In respect of FIG. 2, after transmission of the data packet 200 is completed, phase-locked-loops (PLLs) included in the access point nodes 30a, 30b (AP1, AP2) are held in the aforesaid hold mode of operation on a last value of frequency and time synchronization until transmission of the subsequent acknowledgement data packets 210 is completed.

Utilization of the aforesaid hold mode is practicable for several reasons. A first reason is that the access point nodes 30a, 30b (AP1, AP2) are mutually synchronized to one source, namely the mobile station node (STA) 40. Moreover, a second reason is that a time interval denoted by 700 in FIG. 2 between completion of the data packet 200 and commencement of the acknowledgement data packet 210 is relatively short, for example in an order of 9 μsec pursuant to the aforesaid IEEE 802.1 a standard; moreover, the acknowledgement data packet 210 is relatively short, for example 14 bytes, in comparison to the data packet 200. A third reason is that the acknowledgement data packet 210 is customarily sent at a low data rate which is consequentially robust to frequency and phase errors.

Similar considerations pertain also to data packet transmission from the access point nodes 30a, 30b, 30c (AP1, AP2, AP3) as depicted in FIG. 4. RTS/CTS exchange in FIG. 4 is used for downlink data transmission such that the returning clear-to-send (CTS) data packet is capable of resulting in synchronizing all cooperating access point nodes 30a, 30b, 30c (AP1, AP2, AP3) for a time duration extending to transmission of the entire subsequent data packets 520.

In implementing embodiments of the present invention, there are certain limitations which are relevant. For example, when synchronizing phase-locked-loops (PLLs) of the access point nodes 30a, 30b, 30c (AP1, AP2, AP3) to the mobile station node (STA) 40, time and frequency synchronization errors can arise if the mobile station node (STA) 40 is moving relative to the access point nodes 30a, 30b, 30c (AP1, AP2, AP3), for example due to Doppler frequency shift which is perceived mutually differently at the access point nodes (APs). For example, a Doppler frequency shift in the order of 83 Hz for a carrier frequency of 5 GHz results for a relative velocity between the mobile station node (STA) 40 in respect of its access point nodes 30a, 30b, 30c (AP1, AP2, AP3), such a Doppler frequency shift is relatively insignificant relative to a sub-carrier frequency spacing of 312 kHz and does not, in practice, frustrate implementation of the present invention. Mutually different distances of the mobile station node (STA) 40 from the access point nodes 30a, 30b, 30c (AP1, AP2, AP3) can also give rise to potential errors. For distances in an order of 30 metres, differences in wireless link radiation propagation is in the order of 100-200 nsec which again does not frustrate implementation of the present invention. However, ability of the aforesaid phase-locked-loops in their hold-mode to maintain sufficient frequency and phase stability is an important factor when implementing the present invention, for example in a situation wherein data packets are of relatively long duration.

It will be appreciated that the mobile station node 40 is susceptible to being implemented as a mobile telephone, as a computer including a wireless WLAN transceiver, as a personal data assistance (PDA), as a household robot, as a cordless telephone, as a mobile telephone, as a cell phone, and so forth to mention merely a few potentially practical implementations for the network 10. Methods described in the foregoing when elucidating embodiments of the present invention are susceptible to being implemented on digital hardware and/or by way of one of more software products executable on computing hardware.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A method of communicating one or more data packets within a data communication network, said network including a plurality of communication nodes, wherein a first nodal set comprises a first plurality of said nodes which are operable to communicate via a communication medium with a second nodal set that comprises at least one communication node, said method comprising:
   (a) mutually synchronizing together two or more nodes of said first nodal set as mutually cooperating access point nodes, wherein the two or more nodes of said first nodal set are all mutually synchronized to one source that comprises a communication node of the second nodal set, in response to receiving a data packet from the communication node of the second nodal set, wherein mutual synchronization of the cooperating access point nodes is maintained for a time duration extending beyond reception of the data packet to included transmission of an entire subsequent one or more response data packets; and
   (b) simultaneously in a synchronized manner transmitting one or more response data packets from the mutually synchronized two or more nodes of said first nodal set via said communication medium for substantially simultaneous reception at said second nodal set.

2. The method as claimed in claim 1, wherein said first nodal set comprises a plurality of access point nodes which are mutually coupled in communication via a backbone for further implementing mutual synchronization therebetween, and said second nodal set comprises a mobile station node whose spatial position relative to the first nodal set is susceptible to temporally change, and wherein the communication medium includes wireless communication.

3. The method as claimed in claim 1, wherein said mutual synchronization of said two or more nodes of said first nodal set further includes steps of:
   (c) synchronizing said two or more nodes of said first nodal set to at least one data packet received from said second nodal set, to determine a reference frequency parameter and/or a timing parameter; and
   (d) maintaining operation of said two or more nodes of said first nodal set pursuant to said reference frequency parameter and/or said timing parameter so that subsequent transmission in step (b) of said one or more response data packets to said second nodal set is mutually synchronized.

4. The method as claimed in claim 3, wherein said synchronization in step (c) is assisted by way of a preamble included in data packets communicated to the first nodal set.

5. The method as claimed in claim 3, wherein said synchronization in step (c) is maintained until transmission of said one or more data packets to said second nodal set by utilizing a hold-over mode in phase-locked-loops of said first nodal set implemented pursuant to the standards IEEE 802.11 and variants thereof.

6. The method as claimed in claim 1, wherein said plurality of nodes of first nodal set are mutually coupled together by way of a communication backbone supporting data communication therebetween.

7. The method as claimed in claim 1, wherein said data communication network is implemented as a wireless local area network (WLAN).

8. The method as claimed in claim 1, wherein data packets communicated in the network include at least one of: clear-to-send (CTS), request-to-send (RTS), acknowledgement (ACK), and data packets (DATA) conveying data bundles.

9. A data communication network comprising a plurality of communication nodes, wherein a first nodal set comprises of a first plurality of said communication nodes which are operable to communicate via a communication medium with a second nodal set that comprises at least one communication node, wherein:

(a) two or more nodes of said first nodal set are operable to be mutually synchronized together as mutually cooperating access point nodes, wherein the two or more nodes of said first nodal set are all mutually synchronized to one source that comprises a communication node of the second nodal set, in response to receiving a data packet from the communication node of the second nodal set, wherein mutual synchronization of the cooperating access point nodes is maintained for a time duration extending beyond reception of the data packet to include transmission of an entire subsequent one or more response data packets; and (b) two or more nodes of said first nodal set are operable simultaneously in a mutually synchronized manner to transmit one or more response data packets from the mutually synchronized and simultaneously operable two or more nodes of the first nodal set via a communication medium for substantially simultaneous reception at said second nodal set.

10. A non-transitory computer readable medium embodied with a computer program executable on computing hardware for implementing a method as claimed in claim 1.

* * * * *